United States Patent [19]
Pownall et al.

[11] 4,037,736
[45] July 26, 1977

[54] DUAL CYLINDER RECIPROCATING SOLIDS FEEDER

[75] Inventors: John R. Pownall, Long Beach; Harold E. Carver, Los Angeles, both of Calif.

[73] Assignee: Union Oil Company of California, Brea, Calif.

[21] Appl. No.: 691,633

[22] Filed: June 1, 1976

[51] Int. Cl.² .............................................. F23K 3/00
[52] U.S. Cl. .................................... 214/23; 222/361; 214/152
[58] Field of Search ..................... 214/23, 18 R, 18 B, 214/17 C, 152; 202/262, 263; 222/361, 217; 141/113

[56] References Cited

U.S. PATENT DOCUMENTS 2,498,100  2/1950  Tyrrell .............................. 222/217 X
2,871,170  1/1959  Bewley et al. ................. 214/18 R X Primary Examiner—Albert J. Makay
Attorney, Agent, or Firm—Richard C. Hartman; Dean Sandford

[57] ABSTRACT

A solids feeder for transporting particulated solids from a solids feed supply into the bottom of a solids upflow vessel. The feeder includes a pair of solids feed chutes, each terminating in a bottom outlet located in essentially the same horizontal plane as the bottom solids inlet of the solids upflow vessel and on opposite sides of the bottom solids inlet. A pair of solids feed cylinders provided with hydraulically actuated pistons are vertically mounted in spaced relationship on a reciprocating carriage positioned below the solids upflow vessel. The carriage is reciprocated between two stationary positions in which the cylinders alternately fill with particulated solids and discharge the solids into the bottom of the solids upflow vessel.

16 Claims, 6 Drawing Figures

DUAL CYLINDER RECIPROCATING SOLIDS FEEDER

BACKGROUND OF THE INVENTION

1. Field of the Invention

This invention relates to solids handling, and more particularly to methods and apparatus for introducing particulated solids into the bottom of a solids upflow vessel such as a vertical solids upflow retort vessel used for heat treating oil-producing or oil-containing solids to recover oil and/or gas therefrom.

2. Description of the Prior Art

The problem of transporting particulated solids from a solids feed supply such as a bin or reservoir of the particulated solids into the bottom of a solids upflow vessel has been encountered in diverse operations, exemplary of which are the feeding of oil-producing and/or gas-producing solids such as oil shale, tar sand, bituminous coal, oil-saturated diatomaceous earth, and the like into the bottom of a vertical solids upflow retort for treating the solids to recover oil and/or gas therefrom, and the production of synthesis gas by the reaction of gas containing steam with carbonaceous solids such as coal, coke, and the like.

In these operations, difficulties are encountered in the design and operation of mechanical feed systems because of the nature of the particulated solids being transported, typical solids being abrasive and difficult to handle on the one hand, and on the other being friable and tending to abrade, thereby forming large quantities of undesirable fine particles. Feeder devices used to introduce solids into the bottom of an upflow solids bed must move the solids against the weight of the solids bed. Also, it is often the case that the solids must be transported from a storage bin at atmospheric pressure into a solids upflow vessel which operates at a superatmospheric pressure. These factors, coupled with the often gigantic size of the equipment required to obtain the desired solids feed capacity, and the fact that in some applications the feeder device must operate at elevated temperatures and in contact with liquids and/or gases produced in the solids treating process, produce difficult design problems involving large and complex mechanical forces and complicated mechanical loadings that must be adequately provided for in the feeder design.

A number of different solids feeders for introducing solids into the bottom of a vertical solids upflow vessel have been proposed in the patent literature. Typical of these are U.S. Pat. No. 2,501,153 to Berg which discloses a solids upflow oil shale retort in which the particulated oil shale is introduced into the bottom of the vertical retort by means of a piston reciprocating in a cylinder that is oscillated between the shale feed hopper and the retort inlet. The cylinder is moved into an inclined or canted position below the shale feed hopper and the piston retracted to permit the particulated oil shale to flow by gravity into the cylinder. The cylinder is then oscillated into a vertical position below the retort and the piston moved upwardly to charge the oil shale into the bottom of the retort forcing the entire bed of solids in the retort upward, retorted oil shale being withdrawn from the top of the bed. The feed cylinder is oscillated between the shale feed hopper and the retort inlet by means of a gear and pin drive assembly. U.S. Pat. No. 2,640,014 to Berg discloses a hydraulically oscillating cylinder bottom feeder in which the feeder piston is driven by a hydraulic power cylinder. The feeder is pivotally mounted on a trunion and oscillated between the feed hopper and the bottom inlet of the retort by means of a second hydraulic power cylinder acting laterally upon the bottom of the feed cylinder. U.S. Pat. No. 2,875,137 to Lieffers et al. discloses another embodiment of such device in which the feed cylinder is pivotally mounted on a bottom trunion and oscillated between the shale feed hopper and the retort inlet by means of a second hydraulic power cylinder acting laterally on the top of the feed cylinder. This latter embodiment was successfully employed in a small 2,000 tons per day prototype oil shale retort.

While oscillating cylinder feeders of the type disclosed in the Berg and Lieffers et al. patents can be satisfactorily employed to introduce particulated solids into the bottom of a solids upflow vessel, a number of serious problems and limitations are encountered when utilizing feeders of this type in large capacity commercial units such as solids upflow oil shale retorts having capacities in the range of 10,000 tons per day, or more. Specificaly, the oscillating cylinder feeders for these capacities are extremely large and require substantial clearance between the foundation and the bottom of the retort, increasing the height of the retort structure and adding substantial cost. The clearances between the arcuate shale guard and the bottom of the shale hopper and the retort must be extremely close, i.e., in the range of 0.005 inches or less. Machining of the large parts to these close tolerances cannot be readily obtained, and at best is extremely costly. Also, the capacities of single cylinder feeders are limited, and high capacities require extremely large units operating at relatively high speeds. Furthermore, it is difficult to fill the feed cylinder when it is in the inclined or canted position, and the oscillating cylinder feeders have reduced volumetric efficiency. These factors all contribute to the complexity of the mechanical design, increase the cost, and reduce the operating efficiency of this type of solids feeder.

Various other solids feeder systems have been proposed, exemplary of which are those described in U.S. Pat. Nos. 300,385 to Matieu and 2,029,760 to Derby et al. German Patent No. 144,436 discloses a manually operated device for stoking a boiler with coal which includes a piston-containing cylinder into which the coal is loaded and a lever mechanism for moving the cylinder horizontally into position below the fire box and driving the piston upwardly to force the coal into the bottom of the bed of burning coal. While such device may have application in firing small boilers, it is wholly unsuited for feeding particulated solids into the bottom of a large capacity solids upflow vessel, which may be operated at superatmosphere pressure.

Thus, need exists for a relatively inexpensive, reliable, high capacity, solids feeder for introducing particulated solids into the bottom of a solids upflow vessel, and particularly into the bottom of a vertical solids upflow retort vessel useful for heat treating oil-producing or oil-containing solids to recover oil and/or gas therefrom.

Accordingly, a principal object of this invention is to provide a solids feeder for introducing particulated solids into the bottom of a solids upflow vessel.

Another object of the invention is to provide a solids feeder for introducing particulated solids into the bottom of a solids upflow vessel at relatively high charge rates.

Still another object of the invention is to provide a solids feeder having a high volumetric efficiency.

A still further object of the invention is to provide a high capacity solids feeder for introducing particulated solids into the bottom of a solids upflow vessel in which close mechanical clearances, high bearing loadings, high mechanical stresses, and high speed movement of mechanical parts are minimized.

Yet another object of the invention is to provide a solids feeder for introducing particulated oil shale into the bottom of a solids upflow, fluid downflow retort operating at superatmospheric pressure.

Other objects and advantages of the invention will be apparent from the following description taken in conjunction with the appended drawings.

SUMMARY OF THE INVENTION

The solids feeder of this invention provides a means for transporting particulated solids from a solids feed supply into the bottom of a solids upflow vessel having a bottom solids inlet opening. The solids feeder includes a pair of feed chutes in communication with an elevated solids feed supply, each chute terminating in a bottom outlet located in essentially the same horizontally plane as the bottom solids inlet of the solids upflow vessel and on opposite sides of the bottoms solid inlet. The outlet of each feed chute and the bottom inlet of the solids upflow vessel are uniformly spaced along a common axis. A pair of solids feed cylinders provided with hydraulically actuated pistons are vertically mounted in spaced relationship on a reciprocating carriage below the solids upflow vessel. The carriage is reciprocated in a direction parallel with the common axis between two stationary positions in which the cylinders alternately fill with particulated solids and discharge the solids into the bottom of the solids upflow vessel.

A hydraulic system supplies high pressure hydraulic fluid to the hydraulic power cylinders actuating the solids feed pistons, and to the power cylinder of the actuator that reciprocates the carriage. A control system is provided to control the volumetric solids feed rate, and to control the sequence of movement of the carriage and the solids feed pistons. The volumetric solids feed rate is controlled by adjusting the flow rate of hydraulic fluid to the system. The sequence control system provides a startup sequence motion cycle control, and a shutdown sequence.

Where the solids feeder is used to introduce particulated solids, such as oil shale, into the bottom of a solids upflow, fluid downflow retort for thermal treatment to recover oil and gaseous fractions therefrom, the entire carriage assembly is housed within a fluid-tight housing located at the bottom of the retort.

BRIEF DESCRIPTION OF THE DRAWINGS

The invention will be more readily understood by reference to the accompanying drawings, wherein like parts are identified by like numerals throughout, and in which.

DETAILED DESCRIPTION

Figure 1:
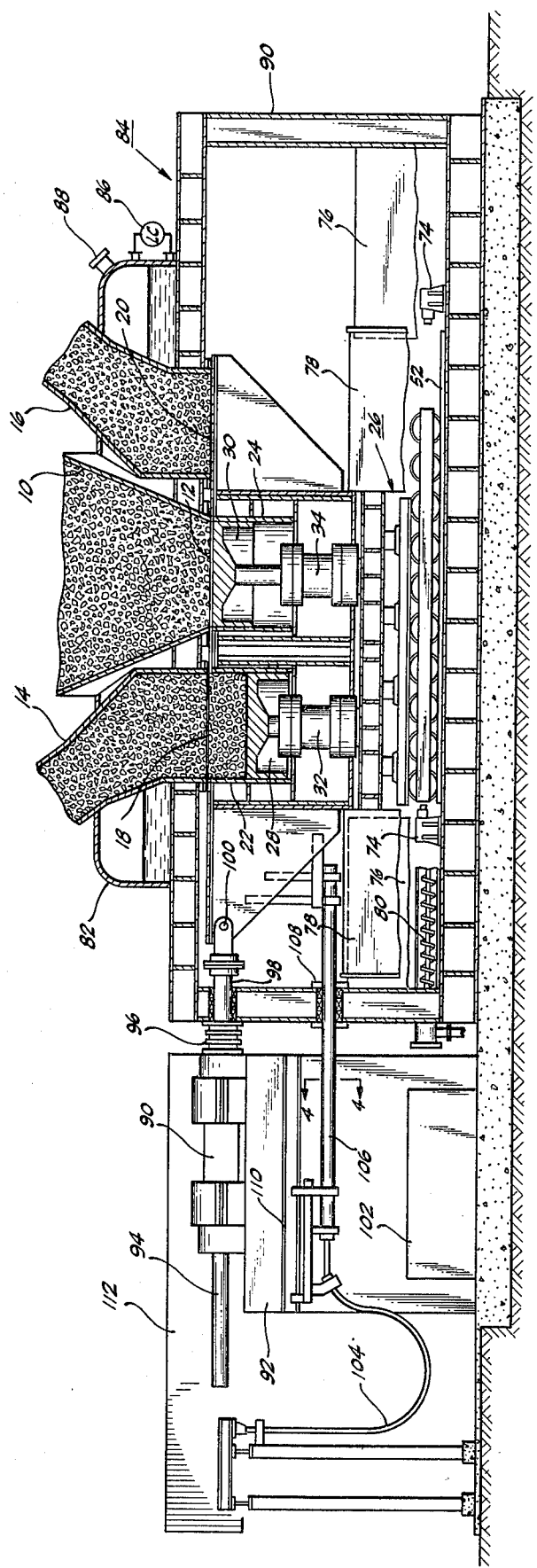
FIG. 1 is an elevation view, in vertical cross-section, of one embodiment of the solids feeder of this invention.

Referring now particularly to FIG. 1, wherein there is shown the bottom section of a solids upflow vessel 10, such as a solids upflow retort, having a bottom solids inlet 12. A pair of feed chutes 14 and 16 communicate with a particulated solids supply source, such as an elevated solids bin, not shown, and terminate in open solids outlets 18 and 20, respectively, which are in essentially the same horizontal plane as solids inlet 12 and disposed an equal distance on either side of the solids inlet along a common axis passing through the center of inlet 12.

A pair of solids feed cylinders 22 and 24 are vertically mounted in spaced relationship on a carriage 26 adapted for horizontal movement below the upflow solids vessel 10. Feed cylinders 22 and 24 are fitted with reciprocatable pistons 28 and 30, respectively, which are reciprocated by hydraulic power cylinders 32 and 34.

Figure 3:
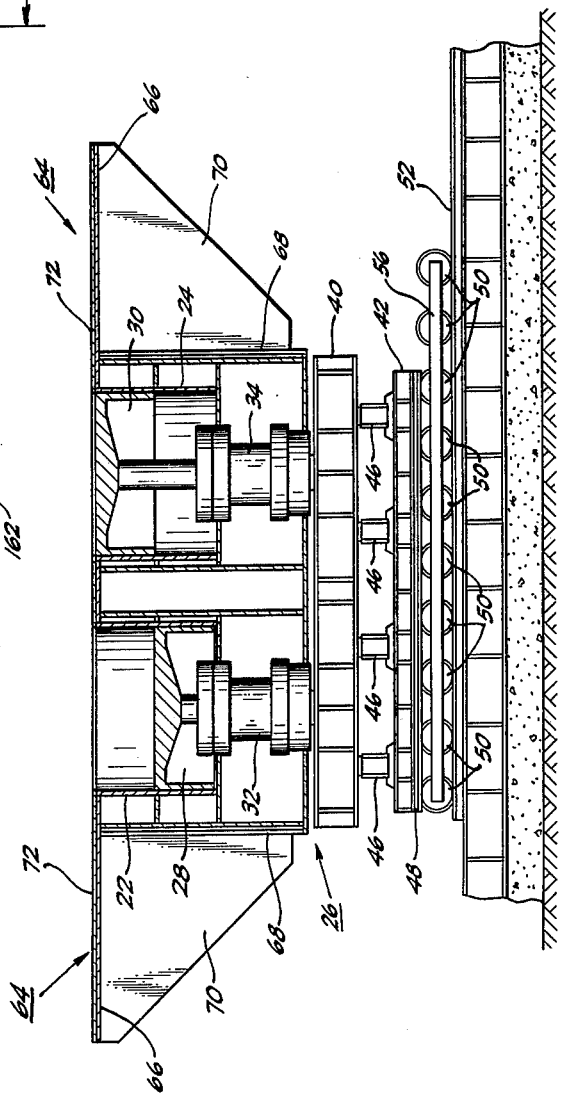
FIG. 3 is an enlarged end view of the carriage.
Figure 2:
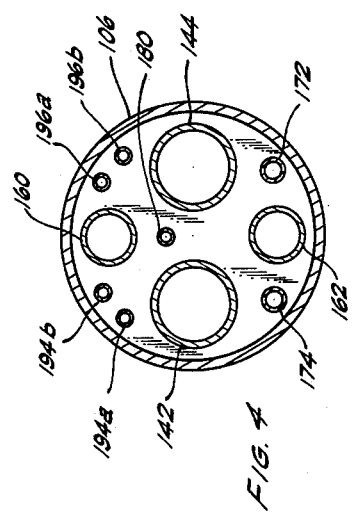
FIG. 2 is an enlarged elevation-view, in partial cross-section, of the horizontally movable carriage.

As more particularly illustrated in FIGS. 2 and 3, carriage 26 is comprised of upper support base 40 on which feed cylinders 22 and 24, and the respective power cylinders 32 and 34 are mounted, and a pair of lower support bases 42 and 44. Upper support base 40 is attached to the support bases by means of a plurality of pin joint assemblies 46, eight of such assemblies arranged in four adjacent pairs being shown in the illustrated embodiment. A pair of upper tracks 48 extend the length of each lower support base, one of such tracks being located on each side of the lower support base.

Carriage 26 is mounted on a plurality of pairs of flanged roller wheels 50 which permit the carriage to be moved along the four parallel tracks 52, which are arranged to be parallel with the common axis through the centers of the solids outlets 18 and 20 and bottom solids inlet 12. Each pair of roller wheels are fixedly mounted on axles 54, whereby both the wheels and the axle comprising each assembly rotate as carriage 26 is moved along tracks 52. A roller connector link 56 extends along each side of the roller assemblies to maintain the spacing between the roller assemblies. The roller connector links are provided with journals, not shown, in which the axles rotate, but these journals are not required to carry the weight of the carriage assembly. Lateral support for the carriage is provided by a pair of guide roller tracks 60 mounted on the supporting structural members and extending the length of the travel of the carriage, and rollers 62 mounted on each side of the carriage to engage the guide roller tracks.

Carriage 26 is provided with a shelf type end frame 64 attached at either end of the carriage assembly. The end frames include a flat horizontal member 66 and a vertical member 68 supported by a plurality of gusset plates 70, four of such plates being shown in each end frame in the illustrated embodiment. The upper surface of the end frame and the top of the carriage are provided with removable wear plates 72 which can be easily replaced when they become worn excessively. The upper horizontal planar surface of the end frames together with the upper horizontal planar surface of the carriage serve as stop gates to prevent flow of the particulated solids from chutes 14 and 16 and from the bottom of solids upflow vessel 10 as the carriage is being moved and the feed cylinders are not properly aligned with the chutes and the bottom inlet of vessel 10. The outlets of the chutes 14 and 16 and the inlet of solids upflow vessel 10 are provided with shear rings, not shown, fitted with a lower removable wear ring, also not shown. The chutes 14 and 16 and the vessel 10 are arranged so that the bottom surface of the wear rings are in essentially the same horizontal plane and provide about ½ inch clearance between the bottom of the wear rings and the top surface of wear plates 72 of carriage 26. This clearance can be varied, depending upon the size and type of the solids being handled, as required to provide a solids seal.

Referring again to FIG. 1, spring bumpers 74 are provided at either end of the tracks 52 to limit the horizontal travel of carriage 26, and to provide a reference position for aligning the carriage in the stationary positions at either terminus of its travel. A fixed, stationary diverter 76 is provided at either end of the tracks 52 to shield the tracks from falling solids and to divert the solids to the sides. Diverters 76 can comprise a plate structure having a triangular cross-section with the apex at the top and open bottom. Nonstationary diverters 78 are of similar configuration and are mounted on either end of carriage 26. Diverters 78 are arranged to pass above the diverters 76 as the carriage is reciprocated, thereby providing shielding for the entire center section of the assembly. Screw conveyors 80 are provided at both sides of the assembly to remove falling solids diverted to the sides by diverters 76 and 78.

In the embodiment of the invention wherein the solids feeder is employed to introduce particulated solids into the bottom of a solids upflow, fluid downflow retort in which the liquid and gaseous constituents are withdrawn at the bottom of the retort, an upper housing 82 is provided enclosing the bottom of vessel 10 and a lower carriage housing 84 is provided to fluid-tightly encase outlet openings 18 and 20 of solids feed chutes 14 and 16, solids inlet opening 12 of vessel 10, and the carriage assembly. Liquid and gaseous fluids pass downwardly through vessel 10 in contact with the upflowing solids bed and pass outwardly through slots, not shown, in the lower section of vessel 10 immediately above bottom inlet 12, and into upper housing 82 which provides a gas-liquid disengaging zone. Upper housing 82 is supported on and is in open communication with lower housing 84. The liquid level is maintained in the upper housing by means of level controller 86, which operates a flow control valve in the liquid withdrawal line, not shown. Gas is withdrawn from the zone of upper housing 82 above the liquid interface by means of gas drawn off nozzle 88. In this manner, the gases and liquids exiting vessel 10 are separated and separately withdrawn from the housing for subsequent processing, and the entire carriage and solids feeder is operated submerged in oil, the oil level being maintained above the bottoms of feed chutes 14 and 16 to provide an oil seal. Preferably, carriage housing 84 is of rectangular construction and is provided with a removable door 90 which can be removed for access into the carriage housing and through which the carriage can be withdrawn for maintenance.

In operation, carriage 26 is moved into a first stationary position as illustrated in FIG. 1, wherein feed cylinder 22 is located immediately below and axially aligned with outlet 18 of feed chute 14 and feed cylinder 24 is positioned immediately below and axially aligned with bottom inlet 12 of solids upflow vessel 10. While in this position, piston 28 is retracted to permit solids to flow by gravity from chute 14 into feed cylinder 22 and, simultaneously, piston 30 is extended to discharge the content of feed cylinder 24 upwardly into vessel 10.

During this sequence of operation, chute 16 is closed off by the end frame 64 positioned immediately below outlet 20. When the feed cylinder filling and discharge operation is completed, carriage 26 is moved along tracks 52 to a second stationary position in which feed cylinder 24 is immediately below and axially aligned with outlet 20 of feed chute 18 and feed cylinder 22 is immediately below and axially aligned with the bottom inlet 12 of vessel 10. While, in this position, piston 30 is retracted to permit solids to flow by gravity from chute 16 into feed cylinder 24 and, simultaneously, piston 28 is extended to discharge the contents of feed cylinder 22 upwardly into vessel 10. During this latter sequence of operation chute 14 is closed off by end frame 64 positioned immediately below outlet 18. The carriage is then returned to the first position to complete the operating cycle. Thus, the carriage is reciprocated between the first and second stationary positions with one feed cylinder being filled and the other feed cylinder being simultaneously discharged in each stationary position.

The above-described operating cycle can be summarized as follows:

| Sequence | Feed Cylinder 22 | Feed Cylinder 24 |
|---|---|---|
| First Position | Fill | Discharge |
| Shift Carriage to Second Position | Idle | Idle |
| Second Position | Discharge | Fill |
| Shift Carriage to First Position | Idle | Idle |

During each sequence, solids downflow from vessel 10 is substantially prevented by the upper planar surface of carriage 26, the upper surface of pistons 28 and 30 when in the fully extended position, or by the supper surface of the solids contained within a full feed cylinder.

Carriage 26 and the carriage support system permit the carriage to be reciprocated between the first and second stationary positions by exertion of a minimum of lateral force in view of the high mechanical load supported by the carriage support system. The entire load of the supported structure and the contained solids is supported on upper support base 40 which, in turn, is carried through pin joint assemblies 46 on lower support bases 42 and 44. This structure is carried on upper tracks 48 which, in turn, are carried on roller wheels 50. Thus, the entire load is movably supported on lower tracks 52 without the use of load carrying journals or bearings.

Figure 4:
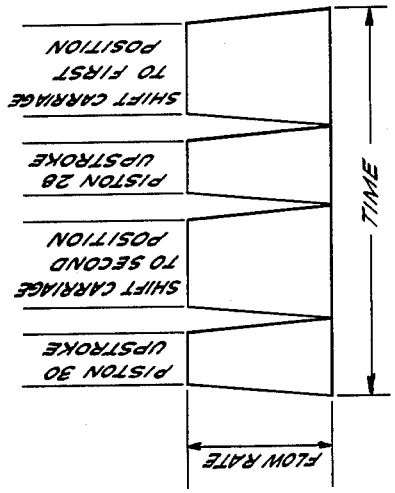
FIG. 4 is an enlarged cross-sectional view of the hydraulic feed pipe taken along the line 4—4 of FIG. 1.

Carriage 26 is reciprocated by means of an actuator including a hydraulic power cylinder 90 fixedly mounted on base 92 and located exterior of carriage housing 84. Connecting rod 94 passes through expansion joint 96 and fluid seal 98, and is connected to carriage 26 by pin joint 100. Power cylinder 90 can be a double rodded, double acting hyraulic cylinder. Hydraulic fluid is supplied to hydraulic cylinder 90 and to hydraulic power cylinders 32 and 34 from hydraulic power fluid source 102 in a manner that will be hereinafter more fully described. Hydraulic power fluids are supplied to power cylinders 32 and 34 mounted on carriage 26 through a plurality of flexible conduits 104 connected to a like plurality of rigid conduits which are, as shown in FIG. 4, carried within reciprocating pipe 106 that passes into carriage housing 84 through fluid seal 108. Reciprocating pipe 106 is movably supported on track 110 and reciprocates with carriage 26. Hydraulic power cylinder 90, hydraulic power fluid source 102, and the outboard terminus of reciprocating pipe 106 can be conveniently housed within a suitable building 112.

Figure 5:
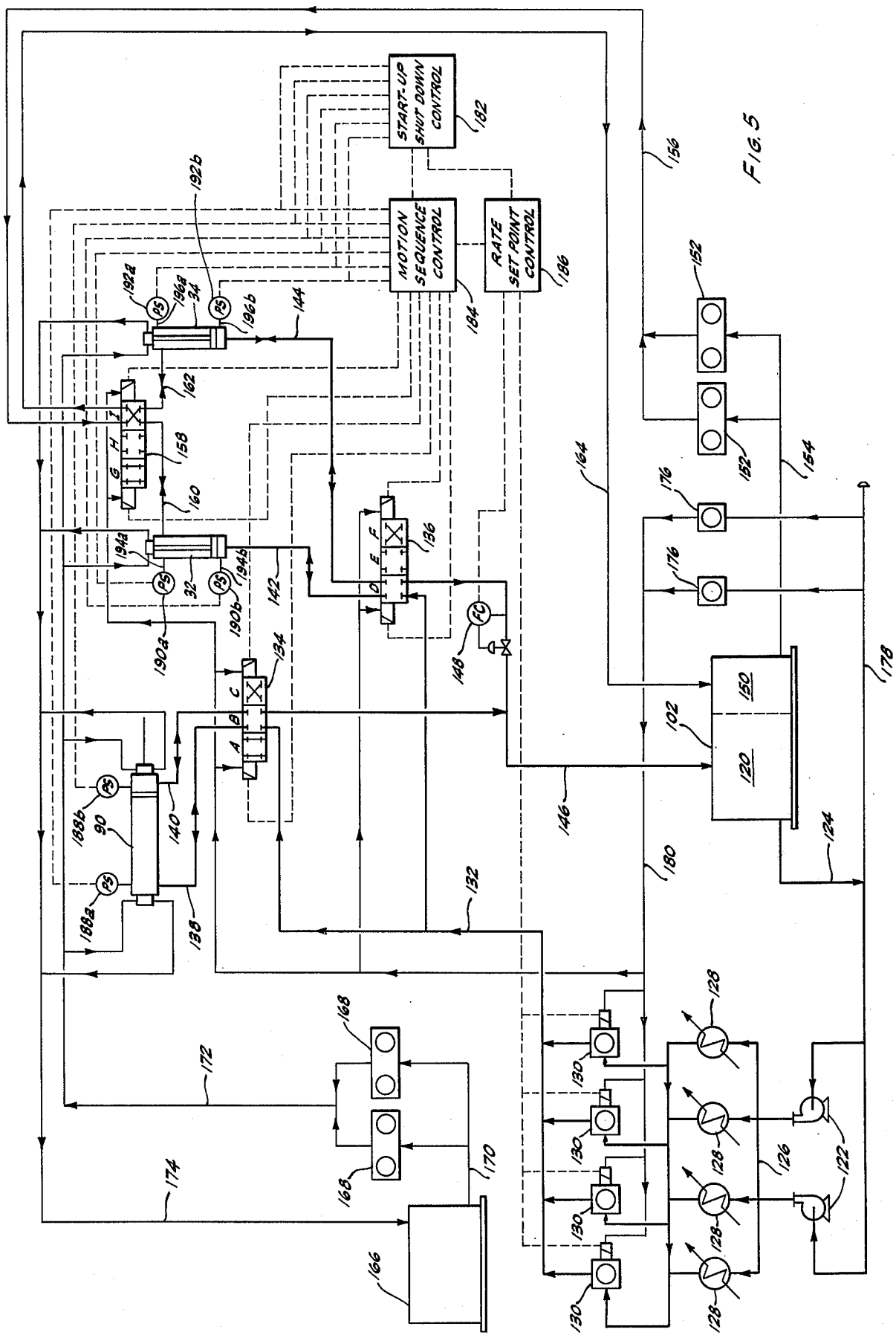
FIG. 5 is a process flow diagram schematically illustrating the hydraulic system.

The hydraulic system used to operate the solids feeder includes four basic component systems: (1) a high pressure fluid power supply operating at a nominal pressure of about 3,000 psig, (2) a low pressure fluid power supply operating at a nominal pressure of 30 psig, (3) a piston rod flushing system, and (4) a pilot pressure system. Referring now to FIG. 5, the high pressure fluid power system supplies the force for moving the solids up into and through solids upflow vessel 10 and the force for reciprocating carriage 26, and includes hydraulic fluid reservoir 102 having separate compartment 120 for the hydraulic fluid used in the high pressure system, two parallel-connected centrifugal booster pumps 122 connected to reservoir 102 by conduit 124, a discharge conduit 126 passing through four parallel-connected coolers 128 in which the hydraulic fluid is cooled by heat exchange against cooling water and which supplies hydraulic fluid to the suction of four parallel-connected variable volume positive displacement pumps 130. Pumps 130 can be either radial piston positive displacement pumps or bent axis positive displacement pumps, with the latter being preferred. The high pressure discharge from pumps 130 passes through conduit 132 to multiported solenoid valves 134 and 136. Solenoid valve 134 is connected to each end of double-acting hydraulic power cylinder 90 by conduits 138 and 140, respectively. Solenoid valve 136 is connected to the lower or high pressure sides of hydraulic power cylinders 32 and 34, respectively, by conduits 142 and 144. Solenoid valves 134 and 136 are also connected to high pressure hydraulic fluid return conduit 146 which returns the hydraulic fluid used in the high pressure system to reservoir 120, the return from solenoid valve 136 including flow controller 148.

The low pressure fluid power supply includes a separate compartment 150 in hydraulic fluid reservoir 102 for the hydraulic fluid used in the low pressure fluid power supply system, two parallel-connected gear pumps 152 connected to reservoir 150 by conduit 154, and a low pressure fluid supply conduit 156 connecting the pump discharge to multiported solenoid valve 158. Solenoid valve 158 is connected to the upper, or low pressure, side of hydraulic power cylinders 32 and 34, respectively, by conduits 160 and 162, and to reservoir 150 through low pressure fluid return conduit 164.

The piston rod flushing system includes a separate flushing oil reservoir 166, two parallel-connected gear pumps 168 connected to reservoir 166 by conduit 170, a flushing oil supply conduit 172 connecting the pump discharge to both rod packing glands of hydraulic power cylinder 90 and to the packing glands of hydraulic power cylinders 32 and 34. Flushing oil is returned to reservoir 166 from each of the packing glands through flushing oil return conduit 174. The flushing oil supplied to the packing glands of the various hydraulic power cylinders minimizes rod and packing gland wear which might occur if solids adhering to the rod surfaces into the packing glands.

The pilot pressure system furnishes hydraulic fluid for moving the directional control valves, for changing the displacement of high pressure hydraulic fluid supply pumps 130, and for power cylinder position sensing. The pilot pressure system includes two parallel connected pilot pressure fluid supply pumps 176 connected to a source of hydraulic fluid by conduit 178. Conduit 180 connected to the discharge of pumps 176 supplies pressurized pilot fluid to each of four rate control solenoid valves integral with each of the four high pressure hydraulic fluid supply pumps 130, i.e., a total of 16 solenoid valves, and to solenoid valves 134, 136 and 158.

The hydraulic fluid power supply systems are controlled by startup-shutdown controller 182, motion sequence controller 184 and rate controller 186. The positions of pistons 28 and 30 and hydraulic power cylinder 90 are detected by an integral hydraulic sensor, not show, at each end of the stroke that hydraulically actuate pressure switches 188a and 188b, respectively. An instrument signal, such as an electrical signal is transmitted from each pressure switch to startup-shutdown controller 182 and motion sequence controller 184. The positions of pistons 28 and 30 in hydraulic power cylinders 32 and 34, respectively, are detected by integral hydraulic sensors, not shown, at each end of the stroke that hydraulically actuate pressure switches 190a, 190b, 192a, and 192b, respectively, through conduits 194a, 194b, 196a and 196b. An instrument signal such as an electrical output signal is transmitted from each pressure switch to startup-shutdown controller 182 and motion sequence controller 184. The pressure switches are preferably located on the exterior of housing 84. The output of startup-shutdown controller 182 is electrically connected to motion sequence controller 184, to rate controller 186, and the output of motion sequence controller 184 is electrically connected to rate controller 186 and to each of the two solenoid units of solenoid valves 134, 136 and 158. The output of rate controller 186 is electrically connected to the set point of flow controller 148 and to each of the four solenoid units integral with each high pressure hydraulic fluid pump 130.

Figure 6:
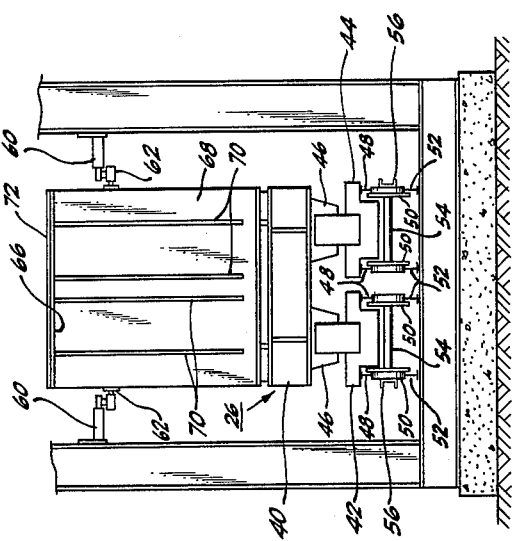
FIG. 6 is a graph illustrating the variation in the flow of fluid during a typical cycle.

In operation, high pressure hydraulic fluid is supplied to either hydraulic power cylinder 90 or hydraulic power cylinders 32 or 34, with the fluid being switched between these users by solenoid valves 134 and 136. In this manner, high pressure hydraulic fluid is being supplied to one or the other end of hydraulic power cylinder 90 to move carriage 26 in the appropriate direction or, alternatively, to one or the other of hydraulic power cylinders 32 or 34 to displace the solids content of the respective feed cylinder upwardly into solids upflow vessel 10. Thus, the high pressure hydraulic fluid is utilized in one of the hydraulic power cylinders, the usage being switched between the various power cylinders depending upon the sequence. Solenoid valves 134 and 136 also switch the high pressure hydraulic fluid return conduit 146 during the appropriate portion of the sequence. The high pressure hydraulic fluid can be supplied continuously without interruption, with only the ultimate use being switched between the various power cylinders depending upon the sequence or, preferably, the supply can be discontinuous with the solenoid valves 134 and 136 being switched during periods of essentially no flow. FIG. 6 shows the variation in the flow rate of the high pressure hydraulic fluid during a complete cycle, with the solenoid valves being switched during the periods of essentially no flow. Variable volume positive displacement pumps are particularly suited for this service since they can be rapidly switched from a neutral mode to a mode in which a predetermined volume of fluid is supplied, providing an acceleration and declaration period to reduce pressure shocks throughout the hydraulic system.

Low pressure hydraulic fluid is suppliied to the upper, or inboard, ends of hydraulic power cylinders 32 and 34 during the downstroke portion of the cycle. This fluid is switched to cylinder 32 or cylinder 34 during the appropriate portion of the sequence by solenoid valve 158, which also switches the hydraulic fluid return from the low pressure end of the cylinder to low pressure hydraulic fluid return conduit 164 during the upstroke of pistons 28 and 30. Feed pistons 28 and 30 carry substantial weight during the filling sequence tending to force the pistons downward. Flow controller 148 limits the outflow of hydraulic fluid from power cylinders 32 and 34 on the downstroke of the pistons to limit the speed of the piston during the cylinder filling sequence.

The speed of movement of carriage 26 between the first and second stationary positions and the stroking speed of feed pistons 28 and 30 affect the volume of solids transported from feed chutes 14 and 16 into the bottom of solids upflow vessel 10, i.e., the solids feed rate. These speeds are controlled by rate controller 186 which adjusts the set point of flow controller 148 and actuates the four solenoid valves in each of the pumps 130. In this manner, high pressure hydraulic fluid is supplied at one of sixteen preselected flow rates. Typical cycle times of a feeder for a solids upflow oil shale retort operated at feed rates of 10,000 and 15,000 tons per day are as follows:

| Step | Sequence | Time, min. | |
|------|----------|------------|---|
| | | 10,000 T/D | 15,000 T/D |
| 1 | Stationary Position 2<br>Feed piston 28 on upstroke<br>Feed piston 30 on downstroke | 0.522 | 0.353 |
| 2 | Carriage moving to Stationary Position 1 | 0.760 | 0.502 |
| 3 | Stationary Position 1<br>Feed piston 28 on downstroke<br>Feed piston 30 on upstroke | 0.522 | 0.353 |
| 4 | Carriage moving to Stationary Position 2 | 0.760 | 0.502 |
| | Total Cycle Time, min. | 2.564 | 1.710 |

The hydraulic system also includes conventional filters, relief valves, isolation valves, and instrumentation, which items are not shown in the drawings.

Solenoid valves 134, 136 and 158 are multiported switching valves capable of simultaneously receiving fluids from two conduits and discharging fluids to two conduits, i.e., a total of four fluid conduit connections to each valve. The internal port mechanism is capable of axial movement into one of three operating positions in which two inlet conduits are connected to two outlet conduits, a closed position in which there is no fluid flow through the valve, and a cross-connected position in which the inlet conduits are cross-connected to the opposite outlet conduits. These positions are identified, respectively, as position A, position B, and position C in the case of solenoid valve 134.; position D, position E and position F in the case of solenoid valve 136; and position G, position H and position I in the case of solenoid valve 158. The internal port mechanism is axially shifted in the valve body in a first direction by a hydraulic cylinder controlled by a solenoid driver mounted at one end of the valve, and in the opposite direction by a second hydraulic cylinder controlled by a solenoid driver mounted at the opposite end of the valve. The hydraulic cylinders are powered by hydraulic fluid supplied from the pilot pressure system. Thus, each solenoid valve can be selectively positioned in any one of the three operating positions depending upon the operational mode desired for a particular sequence.

The operating sequence of multiported solenoid valves 134, 136 and 158 to control the motion of the various hydraulic pistons is illustrated in the following sequence schedule:

| Step | Sequence | Solenoid Valve 134 | Solenoid Valve 136 | Solenoid Valve 158 |
|------|----------|---------------------|---------------------|---------------------|
| 1. | Stationary Position 2<br>Feed piston 28 on upstroke<br>Feed piston 30 on downstroke | Position B<br>No flow | Position D<br>Cyl. 32 supply<br>Cyl. 32 return | Position I<br>Cyl. 32 return<br>Cyl. 34 supply |
| 2. | Carriage Moving to Stationary Position 1 | Position C<br>Inboard supply<br>Outboard return | Position E<br>No flow | Position H<br>No flow |
| 3. | Stationary Position 1<br>Feed piston 28 on downstroke<br>Feed piston 30 on upstroke | Position B<br>No flow | Position F<br>Cyl. 32 return<br>Cyl. 34 supply | Position G<br>Cyl. 32 supply<br>Cyl. 34 return |
| 4. | Carriage Moving to Stationary Position 2 | Position A<br>Inboard return<br>Outboard supply | Position E<br>No flow | Position H<br>No flow |

At the conclusion of step 4, the cycle is completed and step 1 is initiated to repeat the next cycle.

While the solids feeder of this invention has been described in connection with a solids upflow oil shale retort adapted for the feeding of particulated solid oil shale having sizes in the range of about ⅛ to 2 inches, it is to be recognized that the device is not so limited and has utility in the transport of freeflowing particulated solids of any type from an elevated feed bin into the bottom of an upflow solids vessel.

Various embodiments and modifications of this invention have been described in the foregoing description, and further modifications will be apparent to those skilled in the art. Such modifications are included within the scope of this invention as defined by the following claims.

Having now described the invention, we claim:

1. A solids feeder for introducing particulated solids into a solids upflow vessel having a bottom solids inlet opening, which comprises:
 a horizontally movable carriage positioned below said solids upflow vessel;
 carriage actuator means for reciprocating said carriage between first and second stationary positions;

first and second solids feed chutes communicating with an elevated solids feed reservoir for transporting particulated solids from said solids feed reservoir by gravity flow, each of said solids feed chutes terminating in a bottom outlet opening located at opposite sides of and in the same horizontal plane as the bottom solids inlet opening of said solids upflow vessel, and the bottom outlet openings of said first and second solids feed chutes and the bottom solids inlet opening of said solids upflow vessel being aligned in uniformly spaced relationship along an axis parallel with the direction of movement of said carriage;

first and second vertical solids feed cylinders mounted on said carriage in spaced relationship along an axis parallel with the direction of movement of said carriage, said first solids feed cylinder being axially aligned with and immediately below the bottom outlet opening of said first solids feed chute and said second solids feed cylinder being axially aligned with and immediately below the bottom solids inlet opening of said solids upflow vessel when said carriage is in said first stationary position, and said first solids feed cylinder being axially aligned with and immediately below the bottom solids inlet opening of said solids upflow vessel and said second cylinder being axially aligned with and immediately below the bottom outlet opening of said second solids feed chute when said carriage is in second stationary position;

a first solids feed piston movably mounted in said first solids feed cylinder;

a second solids feed piston movably mounted in said second solids feed cylinder;

solids feed piston actuator means for reciprocating said first and second solids feed pistons;

solids sealing means for sealing said bottom outlet openings of said first and said second solids feed chutes and the solids inlet opening of said solids inlet vessel when said first and second solids feed cylinders are not axially aligned therewith; and control means for synchronizing the movement of said carriage and said first and said second solids feed pistons.

2. The apparatus defined in claim 1 wherein said bottom solids inlet opening of said solids upflow vessel, said bottom outlet openings of said first and second feed chutes and said reciprocatable carriage are encased in a fluid-tight housing.

3. The apparatus defined in claim 1 wherein said carriage actuator means includes a hydraulic power cylinder that actuates a connecting rod connected to said carriage.

4. The apparatus defined in claim 1 wherein said solids feed piston actuator means includes a first hydraulic piston cylinder to reciprocate said first solids feed piston and a second hydraulic power cylinder to reciprocate said second solids feed piston.

5. The apparatus defined in claim 1 wherein said control means includes (1) rate control means for controlling the speed of movement of said carriage and said first and second solids feed pistons; and (2) motion sequence control means to effect the movement of said carriage between said first and said second stationary positions while maintaining said first and second solids feed pistons stationary, and to simultaneously move said first and second solids feed pistons in opposite directions while maintaining said carriage stationary in said first or said second stationary positions.

6. The apparatus defined in claim 1 wherein said solid sealing means comprises a horizontal planar surface at the top of said carriage which is maintained in close proximity to the bottom outlet openings of said first and second solids feed chutes and the bottom solids inlet opening of said solids upflow vessel when said first and second solids feed cylinders are not aligned therewith.

7. A solids feeder for transporting particulated solids from an elevated solids feed reservoir and introducing said solids into a solids upflow vessel having a bottom solids inlet opening, which comprises:

a horizontally movable carriage positioned below said solids upflow vessel;

carriage support means for supporting said carriage for reciprocating movement;

carriage actuator means for reciprocating said carriage between first and second stationary positions;

first and second solids feed chutes for transporting the particulate solids from said particulate solids feed reservoir by gravity flow, each of said solids feed chutes terminating in a bottom outlet opening located at opposite sides of and in the same horizontal plane as the bottom solids inlet opening of said solids upflow vessel, and the bottom outlet openings of said first and second solids feed chutes and the bottom solids inlet opening of said solids upflow vessel being aligned in uniformly spaced relationship along an axis parallel with the direction of movement of said carriage;

first and second vertical solids feed cylinders mounted on said carriage in spaced relationship along an axis parallel with the direction of movement of said carriage, said first cylinder being axially aligned with and immediately below the bottom outlet opening of said first solids feed chute and said second vertical solids feed cylinder being axially aligned with and immediately below the bottom solids inlet opening of said solids upflow vessel when said carriage is in said first stationary position, and said first cylinder being axially aligned with and immediately below the bottom solids inlet opening of said solids upflow vessel and said second cylinder being axially aligned with and immediately below the bottom outlet opening of said second solids feed chute when said carriage is in said second stationary position;

a first solids feeder piston movably mounted in said first solids feed cylinder;

a first hydraulic operator means for reciprocating said first solids feed piston in said first cylinder;

a second solids feed piston movably mounted in said second solids feed cylinder;

second hydraulic operator means for reciprocating said second solids feed piston in said second cylinder;

solids sealing means for sealing the bottom outlet openings of said first and second solids feed chutes and the bottom solids inlet opening of said solids upflow vessel when said first and second solids feed cylinders are not axially aligned therewith; and control means for controlling the speed of movement of said carriage and said first and second solids feed pistons, and for effecting the movement of said carriage between said first and second stationary positions while maintaining said first and second solids feed pistons stationary, and to simultaneously move said first and second solids feed pistons in opposite directions while maintaining said carriage stationary in said first or said second stationary positions.

8. The apparatus defined in claim 7 wherein the bottom solids inlet opening of said solids upflow vessel, the bottom outlet openings of said first and second feet chutes, and said reciprocatable carriage are encased in a fluid-tight housing.

9. The apparatus defined in claim 7 wherein said carriage actuator means includes a fixedly mounted hydraulic power cylinder that actuates a connecting rod connected to said carriage.

10. The apparatus defined in claim 7 wherein said solids sealing means comprises a horizontal planar surface at the top of said carriage which is maintained in close proximity to the bottom outlet openings of said first and second solids feed chutes and the bottom solids inlet opening of said solids upflow vessel when said first and second solids feed cylinders are not aligned therewith.

11. The apparatus defined in claim 7 wherein said carriage includes an upper support base upon which said first and second solids feed cylinders, said first and second hydraulic operator means, and said solids sealing means are mounted; a pair of elongated lower support bases in side-by-side relationship, pin connector means for flexibly attaching said upper support base to said lower support base, and two pair of upper tracks fixedly attached in spaced relationship to said lower support bases, one of said upper tracks being located at each side of said lower support bases.

12. The apparatus defined in claim 11 wherein said carriage support means includes:
two pairs of lower tracks fixedly mounted below said solids upflow vessel in the same spaced relationship as said upper tracks, said tracks being parallel with the direction of movement of said carriage; and
a plurality of pairs of wheels, each of said pairs of wheels being fixedly attached to an axle, said wheels being adapted to engage one of said upper tracks and one of said lower tracks to movably support said carriage on said lower tracks; and
means to maintain the longitudinal spacing between said pairs of wheels.

13. The apparatus defined in claim 7 including solids diverter means at each end of said carriage to divert falling solids to the sides of said carriage, and solids collection means for collecting said solids.

14. A solids feeder for transporting particulated solids from an elevated solids feed reservoir and introducing said solids into a solids upflow retort vessel having a bottom solids inlet opening, which comprises:
first and second solids feed chutes for transporting the particulate solids from said solids feed reservoir by gravity flow, each of said solids feed chutes terminating in a bottom outlet opening located at opposite sides of and in the same horizontal plane as the bottom solids inlet opening of said solids upflow retort vessel, and said bottom outlet openings of said first and second solids feed chutes and the bottom solids inlet opening of said solids upflow retort vessel being of approximately the same diameter and aligned in uniformly spaced relationship along a common axis;
two pair of lower tracks fixedly mounted in spaced relationship below said retort vessel, said tracks being parallel with said common axis;
a horizontally movable carriage positioned below said retort vessel, said carriage including an upper support base, a pair of elongated lower support bases in side-by-side relationship, pin connector means for flexibly attaching said upper support base to said lower support base, and two pair of upper tracks fixedly attached to said lower support bases in the same spaced relationship as said lower tracks, one of said upper tracks being located at each side of said lower support bases;
roller means for movably supporting said carriage on said lower tracks, said roller means including a plurality of pairs of wheels, each of said pairs of wheels being fixedly attached to an axle, said wheels being adapted to engage one of said upper tracks and one of said lower tracks in rolling relationship to movably support said carriage on said lower tracks, and means to maintain the longitudinal spacing between said pairs of wheels;
first and second vertical solids feed cylinders mounted on said upper support base in spaced relationship along the longitudinal axis of said carriage, said cylinders being essentially the same diameter and spacing as the bottom outlet openings of said first and second solids feed chutes and the bottom solids inlet opening of said retort vessel;
a first solids feed piston movably mounted in said first solids feed cylinder;
a first hydraulic power cylinder mounted on said upper support base for reciprocating said solids feed piston in said first solids feed cylinder;
a second solids feed piston movably mounted in said second solids feed cylinder;
a second hydraulic power cylinder mounted on said upper support base for reciprocating said second feed piston in said second feed cylinder;
a fluid-tight housing encasing the bottom of said retort vessel, the bottom of said first and second solids feed chutes, and said carriage;
a carriage actuator hydraulic power cylinder located exterior of said housing and having a connecting rod extending into said housing and connected to said carriage for reciprocating said carriage between a first stationary position in which said first solids feed cylinder is axially aligned with and immediately below the bottomm outlet opening of said first solids feed chute and the second solids feed cylinder is axially aligned with and immediately below the bottom solids inlet opening of said retort vessel, and a second stationary position in which said first solids feed cylinder is axially aligned with and immediately below the bottom solids inlet opening of said retort vessel and said second solids feed cylinder is axially aligned with and immediately below the bottom outlet opening of said second solids feed chute;
hydraulic fluid supply means responsive to a control means to supply hydraulic fluid to said first and second hydraulic power cylinders and said carriage actuator; and
control means for controlling the speed of movement of said carriage and said first and second solids feed pistons, and for effecting the movement of said carriage between said first and second stationary positions while maintaining said first and second solids feed pistons stationary, and to simultaneously move said first and second solids feed pistons in opposite directions while maintaining said carriage stationary in said first or second stationary positions.

15. A method for transporting particulated solids from an elevated solids feed reservoir and introducing said solids into a solids upflow retort vessel having bottom solids inlet opening, which comprises:
   transporting said particulated solids by gravity flow from said solids feed reservoir to first and second stations located adjacent to and on either side of the bottom solids inlet opening of said solids upflow vessel;
   positioning a first solids feed cylinder directly below said first station and a second solids feed cylinder directly below the bottom solids inlet opening of said solids upflow vessel;
   simultaneously filling said first solids feed cylinder by gravity flow with particulated solids, displacing the particulated solids contained in said second feed cylinder upwardly into said solids upflow vessel, and preventing the flow of solids fro said solids feed reservoir at said second station;
   positioning said first solids feed cylinder directly below the bottom solids inlet opening of said solids upflow vessel and said second solids feed cylinder directly below said second station;
   simultaneously filling said second solids feed cylinder by gravity flow with particulated solids, displacing the particulated solids contained in said first feed cylinder upwardly into said solids upflow vessel, and preventing the flow of solids from said solids feed reservoir at said first station; and
   positioning said first solids feed cylinder directly below said first station and said second solids feed cylinder directly below the bottom solids inlet opening of said solids upflow vessel.

16. The method defined in claim 15 in which said steps are repeated for a plurality of cycles.

* * * * *

UNITED STATES PATENT AND TRADEMARK OFFICE
CERTIFICATE OF CORRECTION

PATENT NO. : 4,037,736
DATED : July 26, 1977
INVENTOR(S) : John R. Pownall and Harold E. Carver It is certified that error appears in the above-identified patent and that said Letters Patent are hereby corrected as shown below:

In Column 11, claim 1, line 30, after the word "in" and before "second" insert the word --said--.
Column 11, claim 4, line 57 the word "piston" (first occurrence) should read --power--.
Column 13, claim 8, line 7, the word "feet" should be changed to read --feed--.
Column 14, claim 14, line 23, the word "being" should read --having--.
Column 14, claim 14, line 46, the word "bottomm" should be corrected to read --bottom--.
Column 16, claim 15, line 1, the word "fro" should be corrected to read --from--.

Signed and Sealed this

Twenty-ninth Day of November 1977

[SEAL]

Attest:

RUTH C. MASON
Attesting Officer

LUTRELLE F. PARKER
Acting Commissioner of Patents and Trademarks